Figure 1:
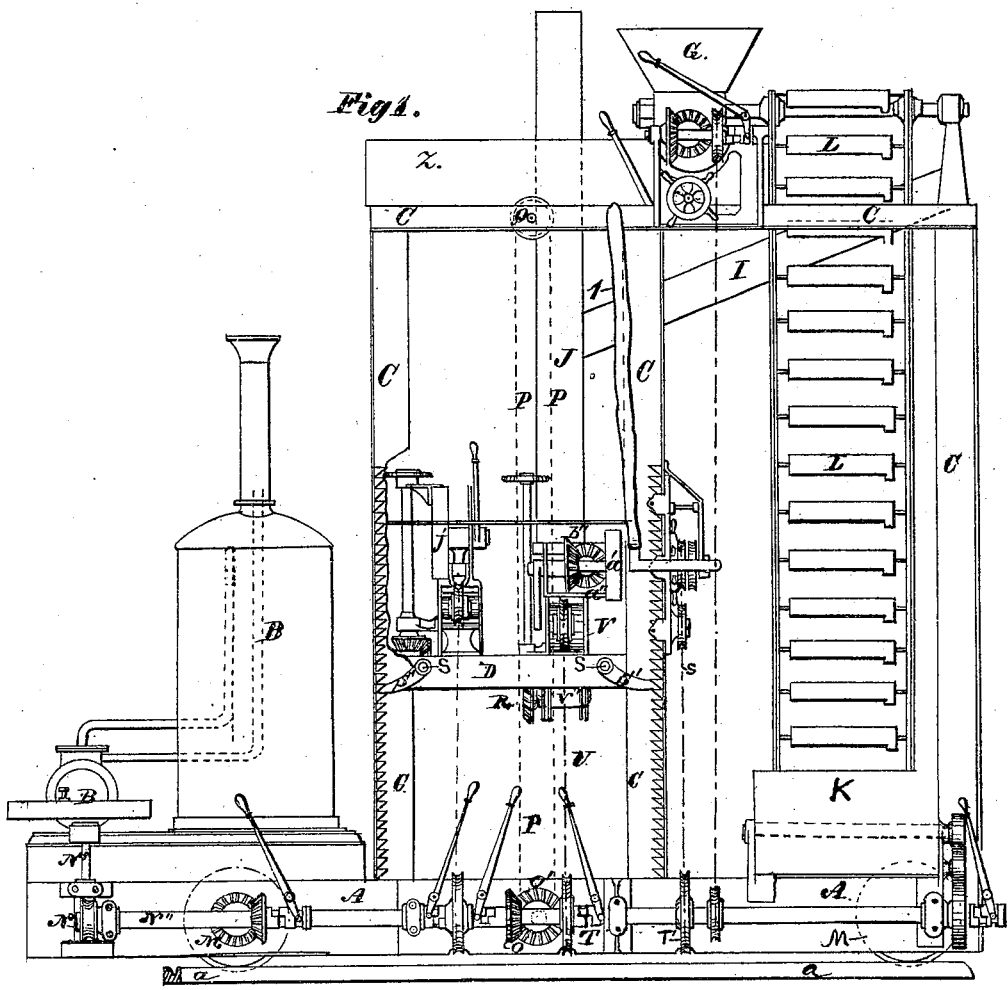

5 Sheets--Sheet 1.

J. SOMERVILLE & J. ROBINSON.
Apparatus for Charging Gas-Retorts.

No. 143,039.         Patented September 23, 1873.

5 Sheets--Sheet 2.

J. SOMERVILLE & J. ROBINSON.
Apparatus for Charging Gas-Retorts.

No. 143,039. Patented September 23, 1873.

Witnesses:
Harris C. Clark
R. N. Dyer.

Inventors.
John Somerville and
John Robinson.
By Dyer, Beadle & Co.
Attys.

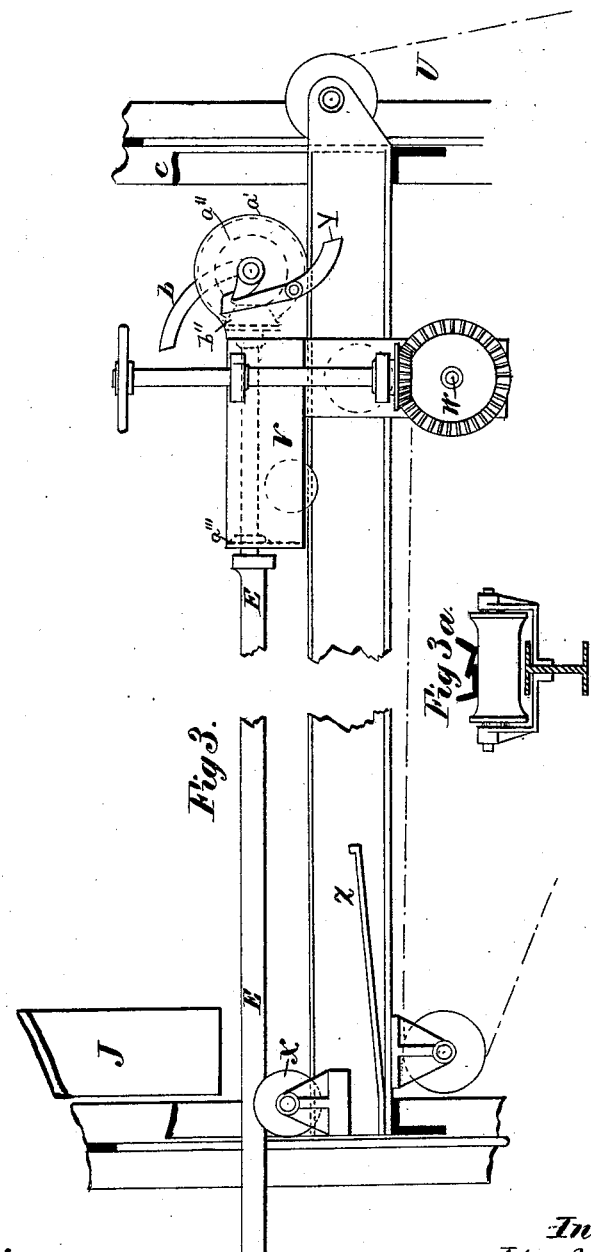

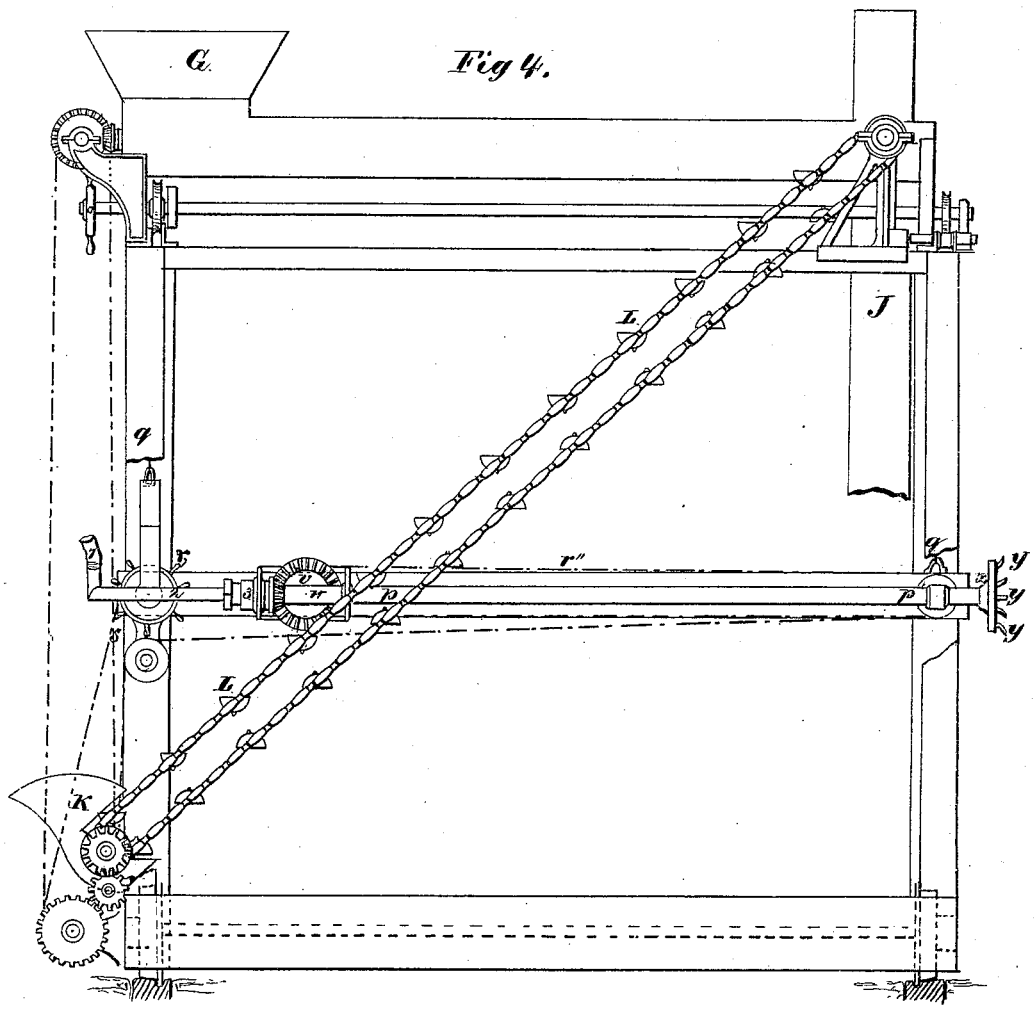

J. SOMERVILLE & J. ROBINSON.
Apparatus for Charging Gas-Retorts.
No. 143,039. Patented September 23, 1873.
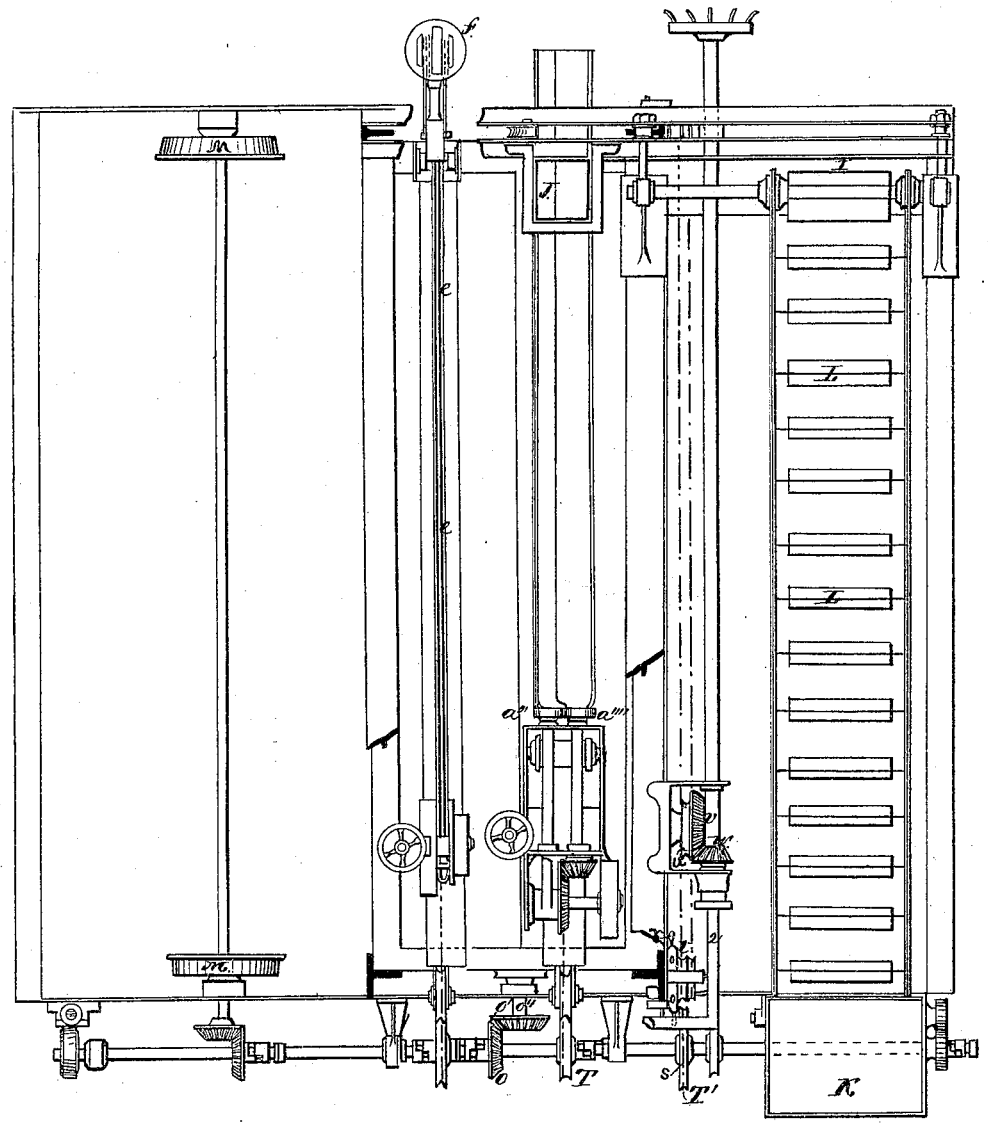

UNITED STATES PATENT OFFICE.

JOHN SOMERVILLE AND JOHN ROBINSON, OF DUBLIN, IRELAND.

IMPROVEMENT IN APPARATUS FOR CHARGING GAS-RETORTS.

Specification forming part of Letters Patent No. 143,039, dated September 23, 1873; application filed October 24, 1872.

*To all whom it may concern:*

Be it known that we, JOHN SOMERVILLE, gas engineer, and JOHN ROBINSON, mechanic, both of the gas-works, in the city of Dublin, Ireland, have invented certain new and useful Improvements in Machinery or Apparatus for Charging, Discharging, and Scurfing Retorts and Furnaces; and we do hereby declare that the following is a full and exact description thereof, regard being had to the accompanying drawings and to the letters of reference marked thereon.

This invention has for its object the construction of machinery or apparatus whereby the manual labor now employed in the retort-houses of gas-works may be greatly reduced; and consists in laying along the floor of the retort-house grooved rails or tram, whereon a platform supported by flanged wheels may run. Upon the platform, and by preference on one side thereof, is fixed a steam-boiler and engine, which propels it and gives motion to the various parts of the machine. On the other side is constructed a substantial upright quadrilateral frame, the corners of which serve as supports and guides for a sort of cradle or secondary platform, upon which rest the scoop or scoops for filling the retorts, or rake for discharging them. On the top of the frame, above the scoop or receptacle, which is supplied with coals from another receptacle below by means of an elevator of peculiar construction, is furnished with an archimedean screw or other equivalent contrivance, whereby the scoop is filled with coals.

When the apparatus is to be brought into action it is driven along until the scoop stands opposite the retort to be charged. Motion is then communicated from the engine to the cradle, which is raised to the height of the retort, and there supported by pawls resting on lugs, brackets, or other suitable device attached to the uprights at each corner of the frame. While the scoop or scoops are being driven into the retort they are at the same time being filled with coal or other material from a vertical sliding shoot supplied by the archimedean screw from the top receptacle, or by means of the elevator from the bottom receptacle, the scoop or scoops being driven forward into the retort by means of the engine acting upon a common chain through the intervention of a differential pulley on the main shaft and other pulleys fixed to the carrier-cradle. The scoop or scoops are now turned over by the action of a volute spring upon an upright shaft operating upon two bevel-wheels. The motion is then reversed, whereon the scoop or scoops is withdrawn, and being provided with a scraper is caused to press against the retort in its passage outward, thereby removing the carbon on some portion of it should any have accumulated. Two small scoops may be used instead of one large one, the advantage of which is that the coal is more evenly spread on the surface of the retort, or an archimedean screw working in the scoop may be used to deposit the coal in the retort. The hoe or rake is attached to the cradle in a similar manner to that of the scoop, and is propelled and withdrawn in the same way. The rake-bar is, however, made U-shaped, in order to admit of a bar sliding within the hollow, so as to raise or depress the blade. The U-shape of the bar is also taken advantage of to allow a stream of water to run down it, and thus prevent the overheating and bending of the same. The rake is morever provided with a volute or other spring, which, while it keeps the rake in contact with the coke, furnishes sufficient elasticity to obviate any damage which might arise from the jamming of the coke in the retort when being withdrawn.

For the purpose of removing the carbon from the interior of the retort the apparatus is so constructed as to allow of a scurfing-bar fitted with suitable points being attached to it in the place of the rake, the said bar being provided with a tubular spring. This spring, which is filled with water in order to maintain its elasticity, is used to press the bar against the retort during the operation of scurfing. Another method of removing the carbon consists in forming a hollow bar, so that it may be supplied with water or steam, with a hollow boss or head having cutters fixed to it and small holes pierced in it for the emission of small jets of water or steam to impinge upon the points of the cutters. The bar thus arranged is made to revolve rapidly against the sides of the retort, whereupon the carbon becomes speedily detached without injury to the retort itself. The machine has also a contrivance whereby the coke drawn from the retort may be delivered to the furnace. This is accomplished by constructing the furnace-door of a peculiar shape and attaching to the machine a kind of chute specially designed for this purpose.

The whole of the foregoing may be combined in one apparatus; but it is preferred, where circumstances will admit, to have two separate machines—one for charging and another for discharging and scurfing—each machine being provided with its own boiler and engine. Manual labor or any other suitable motive power may be substituted for steam in working the machinery. And in order that our said invention may be fully understood we shall now proceed more particularly to describe the same, and for that purpose shall refer to the several figures on the annexed sheets of drawings, the same letters of reference indicating corresponding parts in all the figures.

Figure 2:
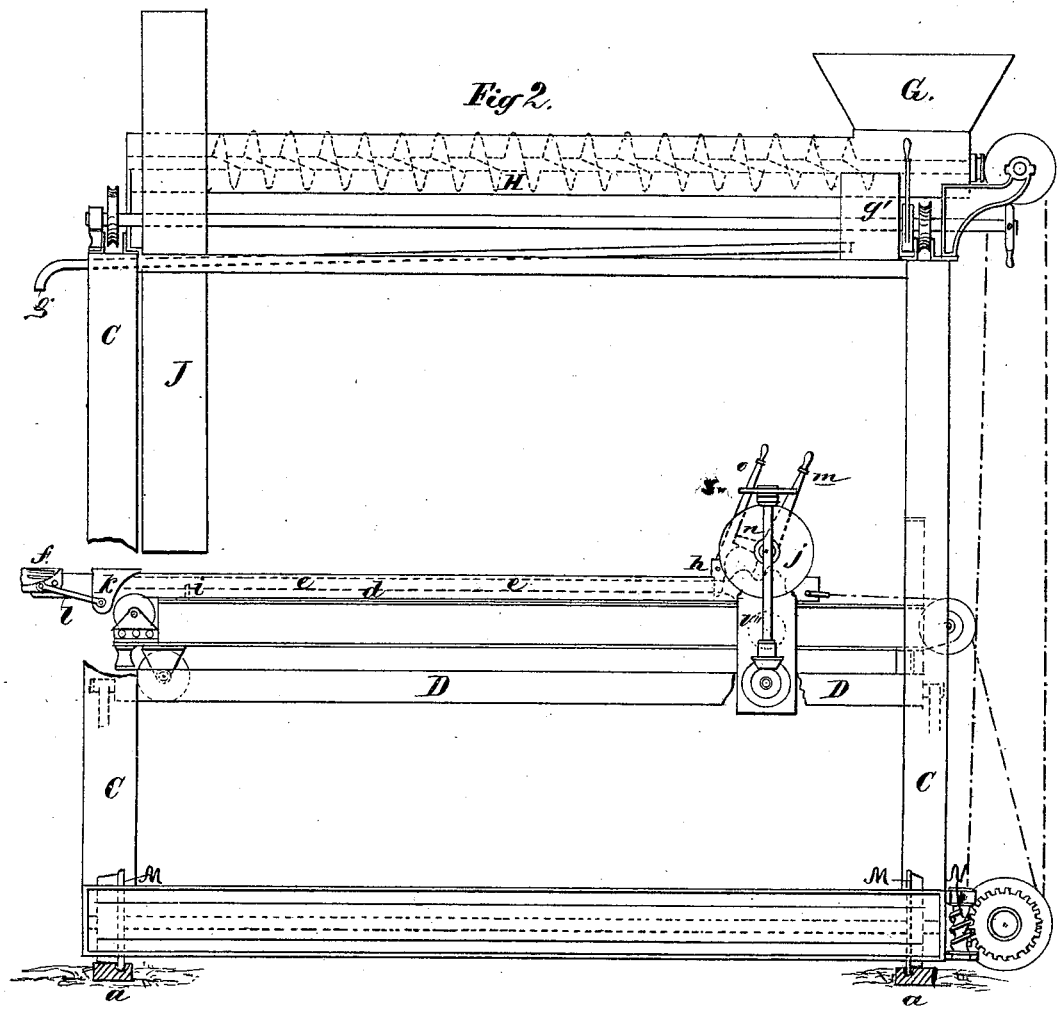

Figure 1 represents a front elevation of the machine; Fig. 2, a side elevation, showing the archimedean screw and rake, the engine and boiler being removed. Figs. 3 and $3^a$ are respectively a side elevation and transverse section of the scoops and their appendages. Fig. 4 is a side elevation of the elevator and scurfing-bar; and Fig. 5, a plan of the machine with a portion of the top framing, engine-boiler, and archimedean screw being removed, in order to show some of the details below.

$a$ $a$ are grooved rails or tram-ways, laid along the floor of the retort-house, whereon a platform, A, Fig. 1, may run. Upon the platform, and by preference on one side thereof, is fixed a steam boiler and engine, B B, which propels it and gives motion to the various parts of the machine. On the other side is constructed a substantial upright quadrilateral frame, C C, the corners of which serve as supports and guides for a sort of cradle or secondary platform, D, upon which rests the scoop or scoops E E, Figs. 3 and $3^a$, for filling the retorts. The rake, shown at $d$ and $f$, Fig. 2, for discharging them is also supported by it. On the top of the frame above the scoop is a receptacle, G, which is supplied with coals from rail or tram way wagons overhead, where it is convenient to do so. The coals, on falling into this receptacle or hopper, are driven forward through a trough by an archimedean screw, H, from whence they fall into an inclined trough, I, communicating with a vertical chute, J, which rises and falls with the cradle D, and which stands immediately above the scoops and delivers the coal into them as they pass forward into the retort. Lateral openings are made in the vertical chute, one for each tier of retorts, so that, as the chute rises, one of these openings will come opposite the end of the inclined trough I. A hinged door, opening inward, is fitted to each of the openings except the top one, in order to prevent any coal which may be discharged into the upper part of the vertical chute from escaping through the lower lateral openings. Where it is inconvenient to bring the coals in overhead they may be brought in on the floor of the retort-house and shoveled into the hopper or receptacle K. This hopper has a slit in the bottom, through which the coals fall into small troughs or buckets L suspended on centers or pivots, the extremities of which are connected to endless chains, and together form an elevator of the description shown in Figs. 1, 4, and 5. By the revolution of this elevator the coals are brought up to the top of the machine, where, on reaching the summit, each bucket is tipped, throwing its contents into the inclined trough I, which then pass to the vertical chute and scoops, as before. A small lever-arm is secured to both ends of the pivots of the buckets, and these arms work in guide-grooves in the sides of the hopper or receptacle K for the purpose of holding the buckets in position when taking up the coal. On arriving at the top, these arms come in contact with fixed stops, which cause them to swivel, and so tip over, each bucket in turn, thereby discharging its contents into the inclined trough I.

When the retort is to be charged the apparatus is driven along by the engine, motion being communicated to the flanged wheels M through the intervention of a worm-wheel and screw, N, the latter being fixed on the fly-wheel shaft N' of the engine, and the worm-wheel fixed on the main shaft N'', until the scoops stand directly opposite the particular retorts to be charged. The cradle D is then raised by throwing into gear the miter-wheels O O', the wheel O' being fast on the transverse shaft O'', which carries two pitch-chain pulleys, having pitch-chains P passing around them and round two other corresponding pulleys, Q, on a shaft in the frame above, each chain being fastened to the cradle at the opposite ends at the point R. The cradle, when raised to the proper height, is supported by detents S', resting in or on racks, lugs, or brackets formed in the angles of the outer frame, the said detents being mounted on each end of the rocking spindles S, and thrown out of gear simultaneously by levers mounted on the two spindles and connected together by a pin and slot. The weights of these levers tend to keep the detents in gear.

The scoops having been thus placed in position, the pulley T is caused to rotate and give motion to a common chain, U, one end of which is fastened to the saddle V, shown in Fig. 3, and the other end to a drum, V', attached to the under part of the saddle, the axis of the drum being marked W. The use of this drum is to let out chain or take up slack of the same, as occasion may require, when the cradle is raised or lowered, a detent and ratchet-wheel being fitted to each drum to prevent the chain from unwinding. This arrangement is seen attached both to the scoops and rake-saddles.

The scoops, which are also attached to the saddle, are thus driven forward while receiving their load of coals from the chute J, the scoops being supported and guided by the saddle at one end, and a roller, X, Fig. 3, at the other. When the scoops have reached the full distance into the retort, catch Y comes in contact with the bar or stud Z, and releases a volute spring contained in the circular box $a'$, which, through the bevel-pinions $a''$ and $b'''$, turns the scoops over, and so deposits their contents on the sides or bottom of the retort.

The scoops are made duplex, or divided longitudinally, as shown clearly in Fig. 3$^a$, each half being, by preference, of an angular section, and turning on its own axis. Both halves of the scoop turn over in an outward direction, (the two being geared together by spur-pinions $a'''$,) so as to deposit the coals against the sides of the retort. On reversing the engine the scoops are withdrawn, in an inverted position, until the lever $b$ presses against a horizontal bar, $c$, fixed to the cradle. The lever $b$ is fixed to an axis having a beveled pinion, $b''$, which communicates motion to the other pinion $a''$, at right angles to it, the shaft of which passes through the fore end of the saddle and turns the two common pinions $a'''$, which are fixed to the two scoops and gear into each other. The result is that the pressure put upon the lever $b$ causes the scoops to resume their normal position, and fit to receive another charge of coal. The end of each scoop is preferably turned down somewhat, so that on its being withdrawn it scrapes the top of the retort, and helps to remove any deposit that may take place on its surface. In order to insure this scraping action during the withdrawal of the scoops, the wall of the upper roller, supporting the front end of the saddle, works in a bearing, which plays in vertical slots in the two sides of the saddle, and is pressed upon by a helical spring and adjusting-screw, working through a plate bolted to a flange on the top of the saddle. As the screw is screwed down it obviously elevates the front part of the saddle, and thus raises the inner ends of the scoops.

The hoe or rake rides upon the cradle by means of a saddle, V$''$, similar to that of the scoops, and is shown in Fig. 2. The rake-bar $d$ is, however, made U-shaped in section, in order to admit of a bar, $e$, sliding within the hollow, so as to raise or depress the head or blade of the rake $f$. The U-shape of the bar is also taken advantage of to allow a small stream or jet of water to run down it from the pipe $g$, supplied from the cistern $g'$, mounted on the top of the framing, and thus prevents the overheating and bending of the same. The rake-head $f$ is grooved or chaneled, so that when in a horizontal position outside the retort any water falling thereon from the pipe $g$ will be retained, and thus tend to prevent overheating of the head of the rake.

When the rake is introduced within the retort it is thrust into it with the blade in the position shown on the drawing, but on attaining the requisite distance, the catch $h$, forming the lower end of the lever $o$, comes into collision with a fixed stud, $i$, and releases a volute spring contained in the box $j$. One end of this spring is fastened to the box and the other to an arbor, upon which is fixed a lever, $m$, the lower end of which lever works in a notch on one end of the sliding bar $e$, as seen in the drawing. The effect of releasing the spring is to depress the blade of the hoe or rake, by causing the bar $e$, sleeve $k$, and connecting-links $l$ to slide back. The blade thus assumes a position suitable for withdrawing it, together with the coke, on the reversal of the engine. The blade of the hoe may again be raised by pulling back the lever $m$ and engaging the catch $n$ with a projection on the lever $o$.

Fig. 4 exhibits a side view of the elevator and a longitudinal view of the scurfing-bar and its accessories, which may be used for scurfing retorts and furnaces. The scurfing-bar $p\ p$ is raised into position for entering the retort by means of the chains $q$ at each end. It is then thrust forward by turning the hand-wheel $r$, which actuates the endless chair $r''$ until it reaches the spot upon which it is designed to operate. Motion is then communicated from the main shaft $N''$ by means of the chain $s$ passing over pulley T$'$, Fig. 5, and around a pulley, $u$, of the same figure, thereby causing the toothed wheel $v$ and pinion $w$, Figs. 4 and 5, to revolve with great rapidity. The bar $p$, to which the small pinion $w$ is attached, will, of course, revolve with the same speed, carrying with it the boss $x$, with the points or cutters $y$. By this means the scurf or accumulated carbon may soon be detached without injury to the retort itself.

In order to keep the points of the cutter cool, water is admitted from the cistern or tank $g'$, shown in Fig. 2, down a flexible pipe, 1, to the metal tube 2, Fig. 4, which passes through a stuffing-box, 3, into the hollow bar $p$. Water, cold air, or steam may thus be caused to traverse the bar $p$, and be emitted through small holes in the boss, and made to impinge upon the cutting-points $y$. The points are thus kept in a condition to do their work effectually.

The whole of the foregoing may be combined in one apparatus, or, where circumstances render it more convenient, two separate machines may be employed, one for charging and the other for discharging and scurfing, each machine being provided with an engine and boiler for its own use.

Having now described and particularly ascertained the nature of our said invention, and the manner in which the same is or may be used or carried into effect, we would observe, in conclusion, that we consider to be novel and original, and therefore claim as the invention secured to us by the hereinbefore, in part, recited Letters Patent, is—

1. The combination of the cradle D, having detents or stops arranged in pairs on rocking-spindles, with the vertical rakes and the operating-levers, as described.

2. In a machine of substantially the described construction, the employment of a water-trough and pipes, as and for the purpose set forth.

3. The revolving tool, provided with cutters, as described, and adapted to receive a stream of water, as and for the purpose described.

4. The combination of the duplex scoops, constructed and arranged as described, with the arm $b$ and bar $c$, as and for the purpose described.

5. The saddle V, having a drum adapted to take up the slack or let out the chain as the cradle D moves vertically, in combination with the scoops E, as described.

6. The combination of the coiled spring in box $a'$, and pinions $a^2$ $b''$ $a'''$ with the scoops, the stop $z$, and catch $y$, as described.

7. The combination of the rake $f$ and U-shaped bar $d$ with the bar $e$, sleeve K, and link $l$, as described.

8. The combination of the elements of the seventh claim with lever $o$, having stud $h$, lever $m$, and spring in box $j$, as described.

JOHN SOMERVILLE.
     JOHN ROBINSON.

Witnesses:
 GEORGE MAHON,
 WM. H. CATLIN.